United States Patent [19]

Yoshida

[11] 4,412,305
[45] Oct. 25, 1983

[54] SENTENCE TRANSLATION DEVICE
[75] Inventor: Kunio Yoshida, Nara, Japan
[73] Assignee: 501 Sharp Kabushiki Kaisha, Osaka, Japan
[21] Appl. No.: 204,924
[22] Filed: Nov. 7, 1980
[30] Foreign Application Priority Data
 Nov. 12, 1979 [JP] Japan .............................. 54-146935
[51] Int. Cl.³ .............................................. G06F 15/38
[52] U.S. Cl. ..................................... 364/900; 364/419
[58] Field of Search ....................... 364/200, 900, 419; 434/167, 157, 169, 176

[56] References Cited

U.S. PATENT DOCUMENTS

| | | | |
|---|---|---|---|
| 3,932,859 | 1/1976 | Kyriakides et al. | 364/900 |
| 4,158,236 | 6/1979 | Levy | 364/900 |
| 4,159,536 | 6/1979 | Kehoe et al. | 364/900 |
| 4,218,760 | 8/1980 | Levy | 364/900 |

FOREIGN PATENT DOCUMENTS 1448211  9/1976  United Kingdom ................ 364/900

*Primary Examiner*—Mark E. Nusbaum
*Assistant Examiner*—Michael R. Fleming
*Attorney, Agent, or Firm*—Birch, Stewart, Kolasch and Birch

[57] ABSTRACT

An electronic translator is provided in which any of a plurality of groups of words, such as sentences, idioms and phrases can be translated from a first language into a second language in response to the input of a single word from one or more of the groups of words in the first language. An additional word can be entered in some embodiments so as to function in the same manner as the single word. At least two types of memories are provided for storing data representing each of the groups of words and their translated equivalents respectively. A detection circuit is provided for detecting whether the single word is equivalent to a word in any of the groups of words retrieved from one of the memories. An address circuit is provided for addressing each of the two memories so as to cause retrieval of the groups of words and their equivalent translated words.

14 Claims, 4 Drawing Figures

SENTENCE TRANSLATION DEVICE

BACKGROUND OF THE INVENTION

The present invention relates generally to an electronic translator and, more particularly, to such an electronic translator for providing a sentence and its translated sentence stored therein.

Recently, a new type of electronic device called an electronic translator has been available on the market. The electronic translator differs from any conventional type of electronic device in that the former is of an unique structure which provides for efficient and rapid retrieval of word information stored in a memory. An example of such eletronic translators was disclosed in Levy, U.S. Pat. No. 4,158,236, issued June 12, 1979, "ELECTRONIC DICTIONARY AND LANGUAGE INTERPRETER".

The conventional electronic translators have been able to retrieve a given sentence and its translated version by specifying each of sentences using each of certain key switches as, conventionally, all the sentences have been entered through a key input device. One of translated sentences has been retrieved from a memory by the actuation of a certain one of the; key switches. This retrieval system required reference to a retrieval table showing each of the relationships between each of sentences and each of the key switches. It was further necessary to operate to select one of relationships, thereby making circui operation complex. As the number of sentences was increased, it became more complicated to operate to select one of the relationships. Essentially, this difficulty is because the total number of the key switches was limited finitely.

Therefore, for those portable electronic translators, it is further desirable to facilitate the generation of each of translated sentences in response to introduction of each of the original sentences.

SUMMARY OF THE INVENTION

In view of the foregoing, it is an object of the present invention to provide an improved electronic translator comprising means for retrieving each a plurality of translated sentences or idioms in response to the introduction of a single word from an equivalent sentence or idiom in the first language corresponding to each of the translated sentences or idioms in the second, translated language.

Other objects, advantages and features of the invention together with the further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to the disclosed preferred embodiments of the present invention, an electronic translator is provided in which any of a plurality of groups if words, such as sentences, idioms and phrases can be translated from a first language into a second language in response to the input of a single word from one or more of the groups of words in the first language. An additional word can be entered in some embodiments so as to function in the same manner as the single word. At least two types of memories are provided for storing data representing each of the groups of words and their translated equivalents, respectively. A detection circuit is provided for detecting whether the single word is equivalent to a word in any of the groups of words retrieved from of the memories. An address circuit is provided for addressing each of the two memories so as to cause retrieval of the groups of words and their equivalent translated words.

BRIEF DESCRIPTION OF THE DRAWING

The present invention will become more fully understood from the detailed description given hereinbelow together with the accompanying drawing which are given by way of illustration only, and thus are not limitative of the present invention and wherein.

DETAILED DESCRIPTION OF THE INVENTION

First of all, any language can be applied to an electronic translator of the present invention. Input words are spelled in a specific first language to obtain equivalent words, or translated words, spelled in a different language corresponding thereto. The languages can be freely selected. According to an example of the present invention that will be discussed hereinbelow, it is assumed that the input language is English and the translated language is German.

Figure 1:
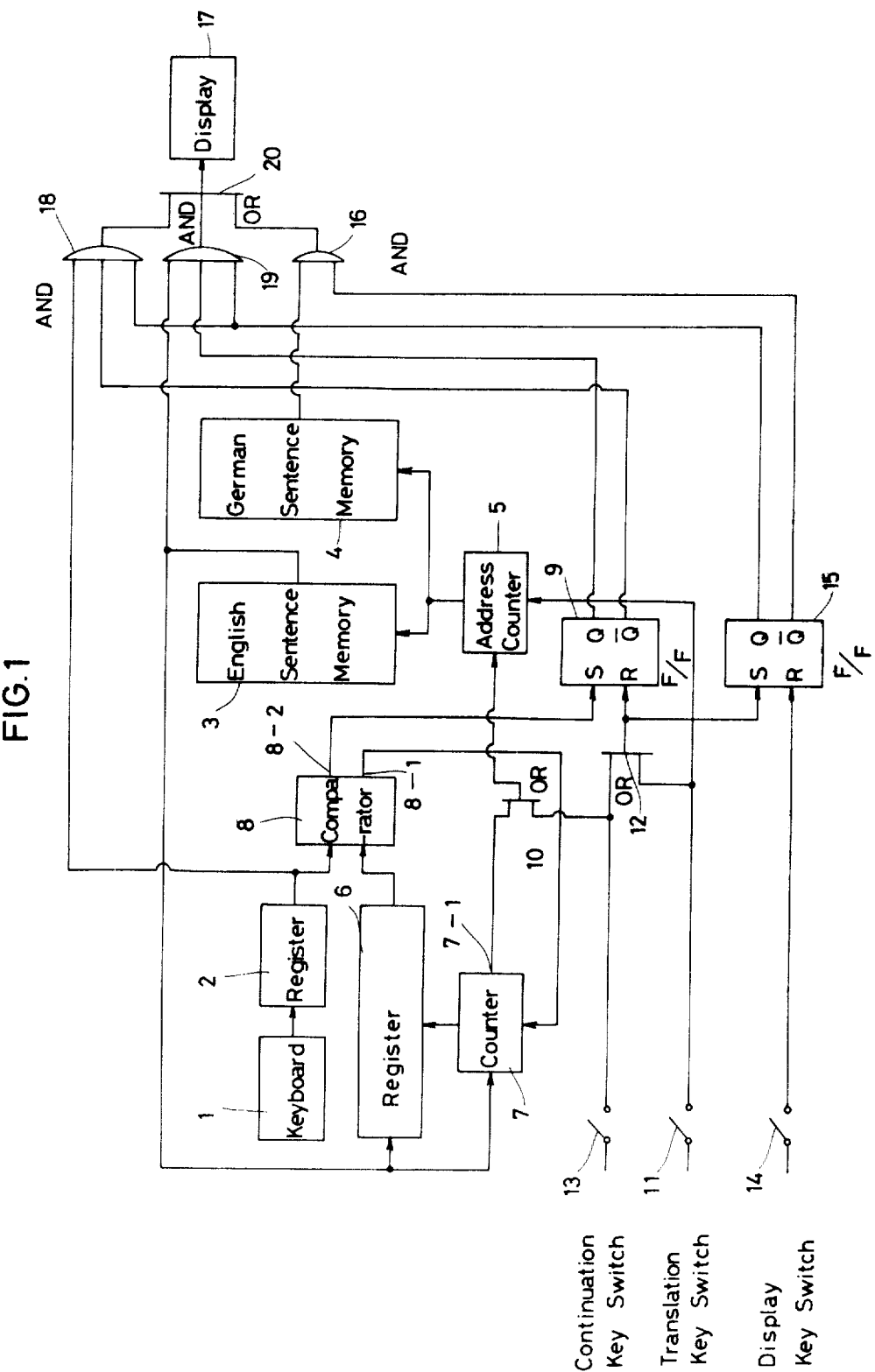
FIG. 1 shows a block diagram of a circuit implemented within an electronic translator according to the present invention.

Referring now to FIG. 1, there is illustrated a circuit implemented within an electronic translator according to the present invention. The circuit comprises an input keyboard 1, a shift register 2, an English sentence memory 3, a German sentence memory 4, an address counter 5, a second register 6, a counter 7, a comparator 8, two flip flops 9 and 15, three OR gates 10, 12 and 20, three AND gates 16, 18 and 19, a continuation key switch 13, a translation key switch 11, a display key switch 14, and a display 17, all of which are interconnected in the manner shown in FIG. 1.

The keyboard 1 is provided to function as an input device for entering selected word in a sentence, phrase or idiom written in a first language, for example English. It contains a certain number of alphabetical key switches each of which can be actuated to enter a single character from the alphabet, and/or digit key switches each actuated to enter a single digit. Various kinds of digital key codes are generated dependent on the specific key switches actuated. The key codes may be any that are conventional in the art. The shift register 2 is connected to the keyboard 1 for receiving the various key codes developed therein.

Figure 2:
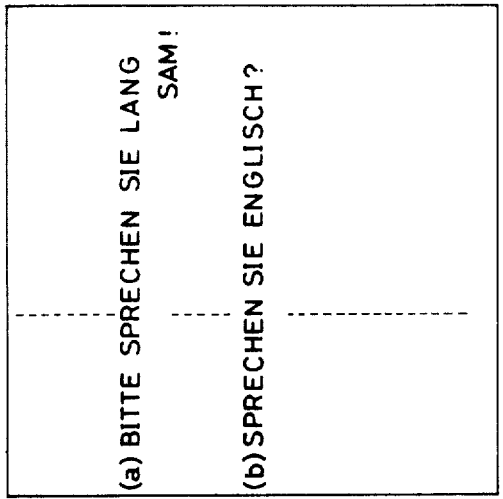
FIGS. 2 and 3 shows schematically the contents of each of an English sentence memory and a German sentence memory both connected in accordance with the circuit of either FIGS. 1 or 4.
Figure 3:
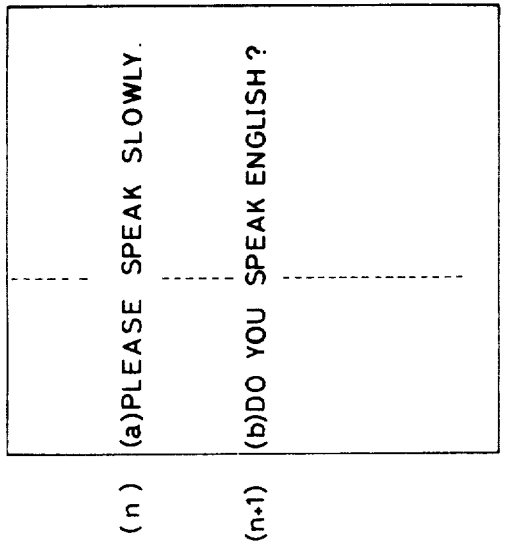

The English sentence memory 3 stores a plurality of groups of words, i.e., English sentences; idioms and/or phrases, while the German sentence memory 4 stores a like plurality of groups of words, i.e., German sentences, idioms and/or phrases which are the counterparts of the English ones. It is set that each of the plurality of English sentences, idioms and/or phrases is stored in the same address of the memory 3 as is each corresponding one of the plurality of German sentences, idioms and/or phrases stored in the memory 4 FIGS. 2 and 3 show this relationship schematically. In this embodiment, each of the memories 3 and 4 stores all words written in capital letters. Hence, while the keyboard 1 may enter words with one or more capital letters, otherwise, one or more lower case letters, they are considered to be identical, say, "English" entered by the keyboard 1 and "English" stored in the memory 3 are considered equivalent.

Preferably, the, plurality of corresponding English and German sentences, idioms and/or phrases in the memories 3 and 4 are stored in such an order that similar sentences, idioms and/or phrases are stored in the more closely adjacent addresses. Similarly, the sentences, idioms and/or phrases each containing the same word can be stored in the more closely adjacent addresses; however, any other type of format can be adopted.

The address counter 5 is provided for simultaneously addressing the memories 3 and 4. The register 6 is coupled to the memory 3 for receiving sequentially each of the English sentences, idioms and/or phrases retrieved therefrom. The counter 7 is also connected to the memory 3 and is provided for counting the number of words in the sentence, the idiom or the phrase stored in the register 6. In accordance with the output of the counter 7, the register 6 sequentially shifts each of the words in the sentence, the idiom or the phrase stored therein to the comparator 8.

Initially, the comparator 8 accepts the single word in the sentence, the idiom or the phrase entered by the keyboard 1 through the register 2. The translation key switch 11 is closed to commence selection of a first group of words from the English sentence memory 3. This is accomplished by the translation key switch 11 being connected to the RESET terminal of the address counter 5. The address counter 5 then causes the group of words first addressed to be transferred to the register 6. The translation key switch is also connected to the RESET terminal R of the flip flop 9 through the OR gate 12. The comparator 8 then serves to compare the single word from the keyboard 1 and each separate one of the words forming the sentence, the idiom or the phrase contained in the register 6. When the single word from the keyboard 1 is not equivalent to a first one of the words in the register 6, the comparator 8 generates an output signal in a given level, say, a high level "1" at an output terminal 8-1 which is coupled to the counter 7 so that the counted value of the counter 7 is advanced by one. Thereby, the next succeeding one of the words from the register 6 is transferred to the comparator 8 to determine its equivalency.

When the single word from the keyboard 1 is found to be equivalent to one of the words in the group then stored in the register 6, the comparator 8 generates an output signal in a high level "1" at an output terminal 8-2 which is coupled to the SET input terminal S of the flip flop 9.

According to the above described circuit arrangement, it is assumed that the register 2 stores a word "English" as a key word as described below and that the sentence "Please speak slowly." is then retrieved from its address in the English sentence memory 3 and is stored in the register 6. (See FIG. 2). The counter 7 is set to the number of the words in the sentence within the register 6, namely, "3". When the counter 7 is adapted to select "0", one of the words in the sentence, "Please" is shifted from the register 6 to the comparator 8. The comparator 8 then functions to compare the words "English" and "Please".

Since, the intially compared are not equivalent, the comparator 8 produces an output signal in the high level "1" on the output terminal 8-1 thereby causing the counted value of the counter 7 to be advanced by one. The second word, namely, "speak", is then shifted from the register 6 to the comparator 8 and subjected to comparison. However, since the words "English" and "speak" are also different from each other, the counted value of the counter 7 is further advanced by one to shift the third word "slowly". As the words "English" and "slowly" are detected to be different from each other by the comparator 8, the output signal in the high level "1" develops on the output terminal 8-1 to cause the counter 7 to be set to 37 3".

Since the counter 7 was set to an initial value of "3", which value has now been also set by the signal from the comparator thereby signifying that no words in the sentence are identical to "English", it then produces an output signal in the high level "1" on an output terminal 7-1, meaning that counting operations by the counter 7 have terminated. The ouput signal on the output terminal 7-1 are applied to the address counter 5 through the OR gate 10 to advance the address of the address counter 5 by one, so that the English sentence memory 3 now retrieves the next English sentence following the sentence "Please speak slowly.". This operation will be described in detail below.

The continuation key switch 13 is employed to continue the process of selection of an English sentence from the memory 3. The key switch 13 is coupled to the address counter 5 through the OR gate 10 and it is also coupled to the RESET terminal R of the flip flop 9 via the OR gate 12.

The display key switch 14 may be used to display the word entered through the keyboard 1, the sentence then being addressed in memory 3, or a translated sentence, idiom or phrase being addressed in memory 4 on the display 17. The key switch 14 is connected to the RESET terminal R of the flip flop 15. A $\overline{Q}$ terminal of the flip flop 15 is tied to one of input terminals of the AND gate 16. Another of input terminals of the AND gate 16 is tied to the output terminal of the German sentence memory 4. Therefore, when the flip flop 15 is reset, a single German sentence as then addressed by the address counter 5 is displayed on the display 17.

Since the two AND gates 18 and 19, and the OR gate 20 are connected as shown in FIG. 1, when the AND gate 18 is rendered conductive by causing the flip flop 9 to be reset and the flip flop 15 to be set, the single word stored in the register 2 is applied to and displayed in the display 17. On the other band, when the AND gate 19 is made conductive by causing the flip flop 9 to be set and the flip flop 15 to be reset, the English sentence then being addressed in the memory 3 is applied to and displayed in the display 17.

According to the above described the circuit's arrangement, circuit operation will now be described with respect to a specific English sentence "Do you speak English ?" which is to be translated into German.

In accordance with the invention and as illustrated in FIG. 2, the English sentence memory 3 stores a sentence "Please speak slowly." in the "n" address and another sentence "Do you speak English ?" in the "n+1" address. The German sentence memory 4 stores the corresponding sentences "Bitte sprechen sie langsam" in the "n" address and "Sprechen sie Englisch ?" in the "n+1" address.

The keyboard 1 is actuated to enter as a key word the single word "English". Key code is developed from the word "English" and is stored in the register 2. There is provided an additional means (not shown) responsive to actuation of the keyboard 1 for causing the flip flop 9 to be reset and the flip flop 15 to be set. At this point, the AND gate 18 becomes conductive so that the word "English" is applied to and displayed in the display 17 via the AND gate 18 and the OR gate 20.

Responsive to the closing of the translation key switch 11, a signal of a high level "1" are applied to the flip flops 9 and 15 via the OR gate 12 so that the flip flop 9 is reset and the flip flop 15 is set. Further, the signal is applied to the address counter 5 to reset is to that it stores a "1". Thus, the first address in each of the memories 3 and 4 is selected initially.

The memory 3 develops the specific sentence, idiom or phrase stored in the first address, which is applied to and stored in the register 6. Unless the specific sentence, idiom or phrase contains the word "English", the address of the address counter 5 is advanced by one to develope a next sentence, idiom, or phrase as described herein-above.

Assuming now that the address of the address counter 5 becomes "n", the memory 3 develops the sentence "Please speak slowly." which is applied to and stored in the register 6.

This sentence is then compared to the key word "English" in the aformentioned manner. At the conclusion of which a "1" signal is applied to the address counter 5 by the counter 7 via the OR gate 10 so that the address counter 5 is advanced to the "n+1" address.

The register 6 receives the next sentence "Do you speak English ?" from "n+1" address of the memory 3. At the same time, the counter 7 is set to the number of words in this sentence, namely, "4". In accordance with the above described operation, the register 6 initially shifts the word "Do" from the first address to the comparator 8. The comparator 8 operates as before to compare the words "English" and "Do".

Since they are different from each other, the counter 7 is advanced by one. When the counter 7 contains "3" and the register 6 shifts the word "English", the comparator 8 detects that the words in the registers 2 and 6 are equivalent. A high level output signal "1" appears on the output terminal 8-2 and is applied to the SET terminal of the flip flop 9 to set it.

The output from the SET output terminal Q of the flip flop 9 is applied to the AND gate 19. Since the AND gate 19 also receives the output from the SET output terminal Q of the flip flop 15 and is also connected to the active output from the "n+1" address in the memory 3, it is made conductive. Thus, the sentence "Do you speak English?" is developed from "n+1" address of the memory 3 to the display 17 via the OR gate 20. The display 17 shows this English sentence.

By the display 17, the operator can confirm that this sentence is that which he wishes to be translated to German. If so, he actuates the display key switch 14 to cause translation of the sentence. A high level signal "1" is developed in response to actuation of the key switch 14. This signal causes the flip flop 15 to be set so that the output from the $\overline{Q}$ terminal becomes a "1" to thereby make the AND gate 16 conductive. Therefore, the German sentence memory 4 is operated to retrieve "Sprechen sie Englisch?" from its "n+1" address which is sent to the display 17 via the AND gate 16 and the OR gate 20. This translated sentence is now displayed in the display 17.

In the case where another sentence idiom or phrase containing the key word "English", e.g., "I can speak English" is stored in a certain address, say, the "n+1" address of the memory 3 and the sentence whose translation is desired, "Do you speak English?" is stored in the next address, the "n+2" address of the memory 3, the comparator 8 detects the above described equivalency in accordance with the above described operation. In this case, the sentence "I can speak English." is displayed in the display 17.

The operator, of course, knows that this sentence is not the one in question. He, therefore, operates the continuation key switch 13 causing a high level "1" signal to appear on the line coupled to the RESET terminal R of the flip flop 9 resetting it. Further, the signal is applied to the address counter 5 via the OR gate 10. The address counter 5 advances by one to become "n+2". The memory 3 then develops the sentence in question from the "n+2" address according to the previously described procedure.

Figure 4:
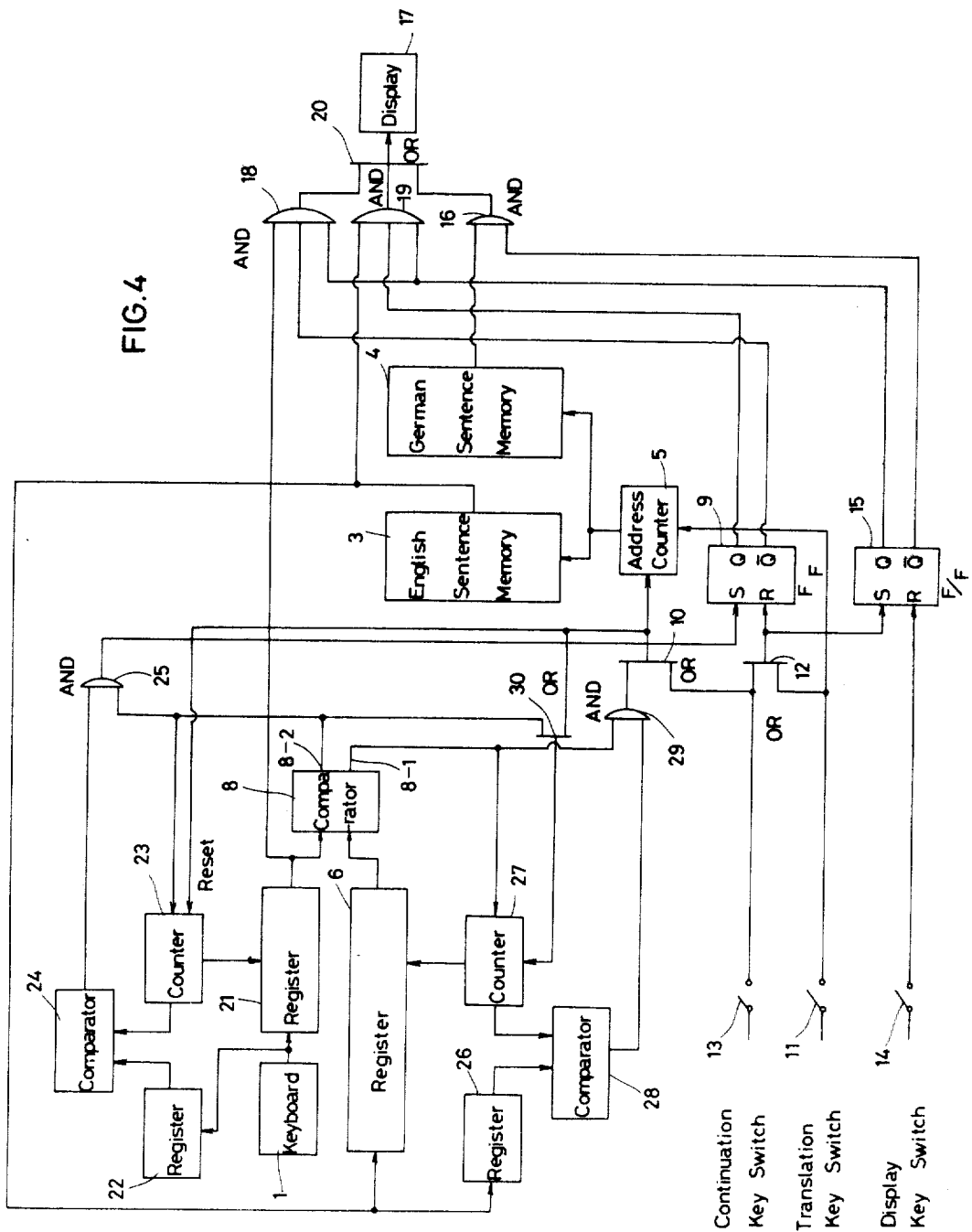
FIG. 4 shows a block diagram of another circuit implementing another electronic translator according to the present invention.

FIG. 4 shows a block diagram of another circuit according to the present invention. Like elements corresponding to those of FIG. 1 are indicated by like numerals.

A main feature of FIG. 4 is that two key words can be entered to identify a specific sentence to be translated. In the case where "Do you speak English?" is to be translated, the two key words of "speak" and "English" may be entered.

In addition to the circuit elements referenced by numerals 1 to 20, except register 2 and counter 7 as described with respect to FIG. 1, the circuit of FIG. 4 comprises three registers 21, 22 and 26, two counters 23 and 27, two comparators 24 and 28, two AND gates 25 and 29, and an OR gate 30.

The register 21 is similar to register 2 in FIG. 1 and is provided for receiving the two key words entered through the keyboard 1. The register 22 is also connected to the keyboard 1 and operates to store the number of words sent from the keyboard 1 to the register 21. The counter 23 functions to selectively address the register 21. The comparator 24 compares the contents of the register 22 with those of the counter 23. If they are equivalent, the comparator 24 applies its output signal to the SET input terminals of the flip flop 9 via the AND gate 25. The counter 23 receives those output signals representative of the presence of equivalency by the comparator 8, so that the counter 23 advances its counted value in response to the input of the equivalency output signals.

The register 26 operates to store the number of words contained in each group of words retrieved from the memory 3. The counter 27 selectively addresses the register 6. The comparator 28 compares the contents of the register 26 with those of the counter 27. When they are equivalent, the comparator 28 directs an output signal to the address counter 5 via the AND gate 29 and the OR gate 10. The RESET input terminal of the counter 27 is coupled to the output terminal 8-2 of the comparator 8 representing occurrence of the equivalency via the OR gate 30.

Once again using the assumption that a specific sentence "Do you speak English?" is to be translated, operation of the circuit of FIG. 4 is described as follows:

As the two key words, "speak" and "English" are entered by the keyboard 1 and stored in the register 21, the register 22 is operated to contain a "2". The counter 23 is assumed to have been previously in the reset model. The translation key switch 11 is closed to commence a search for the specific sentence in question in the memory 3.

When the address counter 5 contains an "n", a sentence "Please speak slowly." may be retrieved from the "n" address in the memory 3. This sentence is introduced into the register 6. The number of words in this sentence, namely, "4" is stored in the register 26. The counter 23 directs that the first key word "speak" be transferred from the register 21 to the comparator 8. Similarly, the counter 27 causes the first word "Please" in that sentence which is stored in the register 6 to be supplied to the comparator 8. Therefore, the comparator 8 compares these two words "speak" and "Please".

As these two words are not equivalent, the comparator 8 generates an output signal on the output terminal 8-1 to thereby advance the counted value of the counter 27 by one. The second word "speak" in that sentence stored in the register 6 is then sent to the comparator 8, whereby the comparator 8 compares the second word "speak" from the sentence with the first key word "speak" contained in the register 21. In this case, the comparator 8 provides an output signal on the output terminal 8-2 for application to the counter 23 to thereby provide a "1" in the counter 23 and to advance its counted value by one. The register 21 then shifts the second key word "English" to the comparator 8.

In addition, the output signal from terminal 8-2 of the comparator 8 is introduced into the RESET input terminal of the counter 27 via the OR gate 30 to thereby reset the counter 27. The first word "Please" and those following it in the register 21 are again applied sequentially to the comparator 8. In this case, no equivalency is detected between the second key word "English" and any of the words in the register 6. Each time one of the words in the register 6, "Please", "speak" or "slowly" is subjected to examination of equivalency by the comparator 8, the counter 27 is advanced by one. When all of the words have been subjected to examination for equivalency by the comparator 8, the counter 27 contains a "3".

Therefore, the comparator 28 detects that the contents of the counter 27 are now equivalent to those of the register 26. The comparator 28 provides its output signal at the high level "1" to the address counter 5 via the AND gate 29 and the OR gate 10. The address of the address counter advanced by one to thereby contain "n+1".

Responsive to the "n+1" address set in the address counter 5, another sentence "Do you speak English?" is retrieved from the memory 3 from the "n+1" address. This sentence is applied to the register 6. The above examination for equivalency between each of the key words stored in the register 21 and each of the words in the register 6 is repeated by the comparator 8. When the first key word "speak" is examined and detected to be equivalent to one of the words in the register 6, the value of the counter 23 is improved by one. Therefore, the second key word "english" is subjected to examination of equivalency.

When one of the words stored in the register 6 is detected to be equivalent to the second of the key words, the comparator 8 provides its output signal to thereby cause the counter 23 to contain a "2". The comparator 24 compares the contents of the counter 23 with those of the register 22. Since they are equivalent to each other, the output signal from the comparator is applied to the AND gate 25.

As the AND gate 25 has received the output signal from the comparator 8 as well, the AND gate 25 becomes conductive to provide a high level "1" output signal which are introduced into the SET input terminals of the flip flop 9 to set it. With the set output by the flip flop 9, the AND gate 19 becomes conductive so that the sentence "Do you speak English?" from the "n+1" address in the memory 3 is sent to the display 17.

After the operator confirms that this sentence thus displayed is identical to one desired, he actuates the display key switch 14 so that its translated German sentence "Sprechen sie Englisch?" is retrieved from the "n+1" address of the memory 4 and indicated in the display 17 via the AND gate 16.

According to the above teaching of the present invention, it is also contemplated that three or more key words can be entered to address each of the memories 3 and 4 so as to provide more rapid examination for equivalency.

While only certain embodiments of the present invention have been described, it will be apparent to those skilled in the art that various changes and modifications may be made therein without departing from the spirit and scope of the invention as claimed.

What is claimed is:

1. An electronic language translator for use in translating any of a certain plurality of groups of words from a first language into a second language, the translator comprising:

an input means for entering and storing a selected word from a chosen group of words corresponding to one of the certain plurality of groups of words in the first language;

a first memory means for storing data representing each of the plurality of groups of words in the first language;

an address means responsive to the input means for addressing the first memory means to cause sequential retrieval of each of the plurality of groups of words stored in the first memory means;

a detection means connected to the first memory means and responsive to the addressing of the first memory means by the address means for detecting equivalency between the selected word stored in the input means and any word of any one of the plurality of groups of words retrieved from the first memory means;

a second memory means for storing data representing a second and like plurality of groups of words in the second language, each of the second groups of words being the translation of one of the groups in the first language and being correspondingly addressed within the second memory means as is its counterpart in the first memory means, the second memory means being simultaneously addressed along with the first memory means by the address means such that upon a detection of equivalency by the detection means, the corresponding, translated group of words in the second language is retrieved; and a display means responsive to the detection means for displaying the corresponding, translated group of words in the second language that has been retrieved from the second memory means whereby translation of a group of words from the first language to the second language can be accomplished by inputting only a single word selected from the group of words in the first language.

2. An electronic language translator according to claim 1, wherein the address means is further responsive to the detection means to sequentially address the first memory means to retrieve additional groups of words from the first memory means until a group of words including the selected word is detected.

3. An electronic language translator according to claim 2, wherein means are further provided for causing display of the detected group of words including the selected word so that it can be ascertained whether the displayed group of words is the group whose translation is desired.

4. An electronic language translator according to claim 3, wherein means are further provided for causing the address means to further retrieve groups of words from the first memory means until the desired group of words for translation into the second language is detected.

5. An electronic language translator according to claim 1, wherein the input means and the detection means are each adapted to process at least two words from the chosen group of words.

6. An electronic language translator according to claim 1, wherein each of the plurality of groups of words constitutes a sentence, an idiom or a phrase in the first language.

7. An electronic language translator according to claim 1, wherein means are further provided for displaying the selected word entered in the input means prior to commencement of comparison of the plurality of groups of words stored in the first memory means so that an operator can immediately ascertain whether an error in entry has been committed.

8. An electronic language translator according to claim 7, wherein the input means includes a first switching means connected to the address means for commencing operation thereof.

9. An electronic language translator according to claim 7, wherein the input means includes a second switching means connected to the address means for continuing operation of the address means so as to locate a second one of the plurality of groups of words stored in the first memory means that includes the selected word.

10. An electronic language translator according to claim 1, wherein the address means includes an address counter the output of which is connected to both the first and the second memory means.

11. An electronic language translator according to claim 9, wherein the input means includes a third switching means connected to the display means for causing the display of one of the plurality of groups of words in the first language that is detected as having the selected word included therein.

12. A method for translating any of a certain plurality of words from a first language into a second language, the method comprising the steps of:

storing digital data representing each of the plurality of groups of words in the first language in a first memory means;

storing digital data representing each of a second and like plurality of groups of words in the second language in a second memory means, each of the second groups of words being the translation of one of the groups of words in the first language and being correspondingly addressed within the second memory means as is its counterpart in the first memory means;

selecting a key word from a chosen group of words corresponding to one of the certain plurality of groups of words in the first language that are stored in the first memory means;

sequentially retrieving each of the plurality of groups of words in the first language stored in the first memory means;

comparing separately each of the words in each of the plurality of groups of words in the first language as they are sequentially retrieved with the key word and thereby detecting any equivalency therebetween;

determining that one of the plurality of groups of words in the first language that is detected as having a word identical to the selected word is the group whose translation into the second language is desired; and retrieving the group of words in the second language corresponding to the group of words in the first language whose translation is desired whereby the translation of a group of words from the first language to the second language can be accomplished by use of only a single word selected from the group of words in the first language.

13. A method according to claim 12, wherein at least two key words are selected and separately and sequentially compared to each of the words in each of the plurality of groups of words in the first language.

14. A method according to claim 12, wherein each of the plurality of groups of words is a sentence, a phrase or an idiom.

* * * * *

UNITED STATES PATENT AND TRADEMARK OFFICE
CERTIFICATE OF CORRECTION

PATENT NO.   : 4,412,305
DATED        : October 25, 1983
INVENTOR(S)  : Kunio YOSHIDA It is certified that error appears in the above–identified patent and that said Letters Patent are hereby corrected as shown below:

In the Heading of the Patent, in the category "[73] Assignee:", change "501 Sharp Kabushiki Kaisha" to --Sharp Kabushiki Kaisha--

Signed and Sealed this

Thirty-first Day of January 1984

[SEAL]

Attest:

Attesting Officer

GERALD J. MOSSINGHOFF

Commissioner of Patents and Trademarks